Jan. 29, 1957  R. A. GAISER  2,779,690
METHOD AND APPARATUS FOR FORMING SURFACE FILMS
Filed June 30, 1950
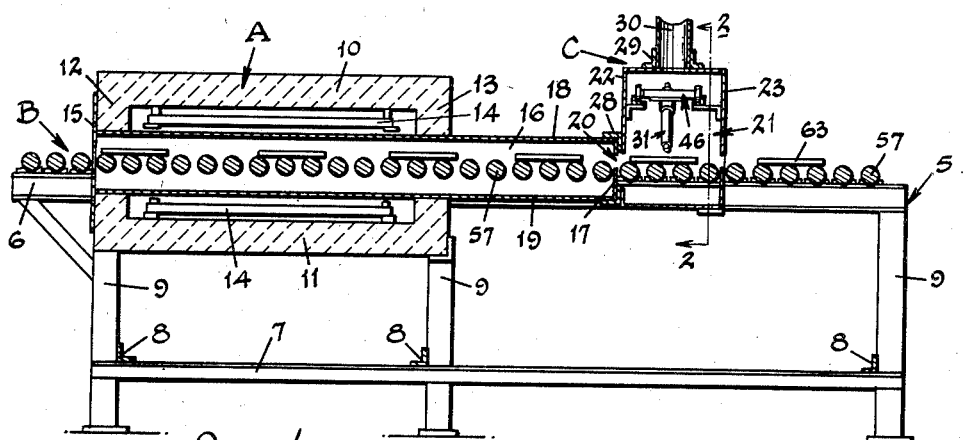
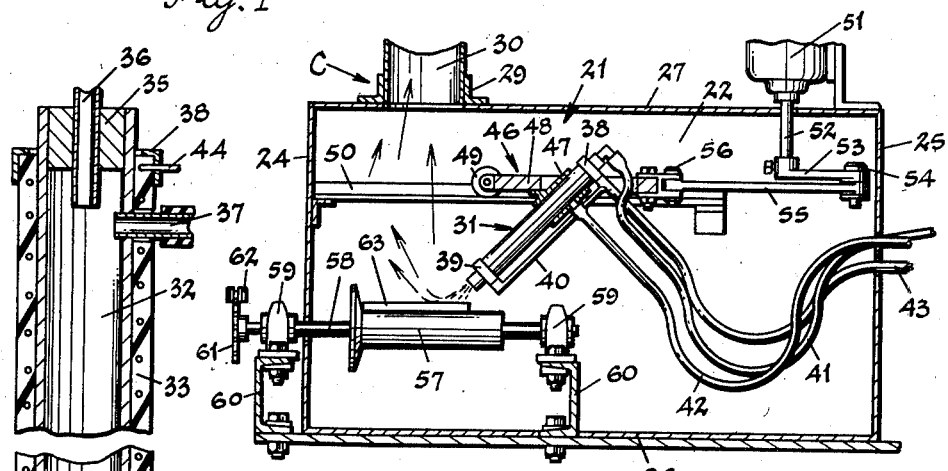
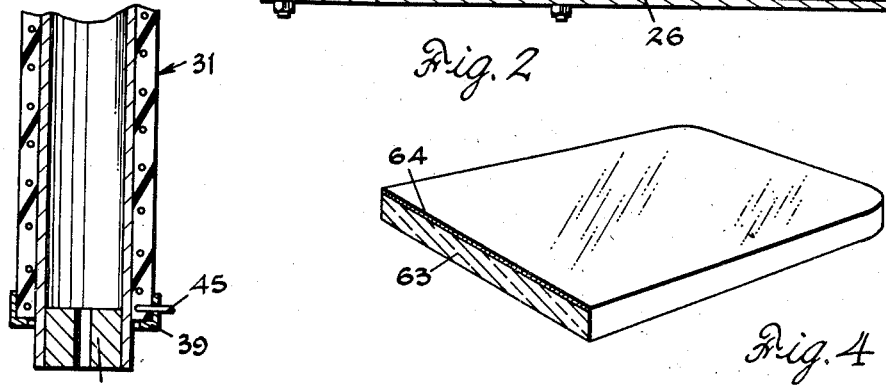
Inventor
Romey A. Gaiser
By Nobbe & Swope
Attorneys United States Patent Office 2,779,690
Patented Jan. 29, 1957

2,779,690

METHOD AND APPARATUS FOR FORMING SURFACE FILMS

Romey A. Gaiser, Toledo, Ohio, assignor to Libbey-Owens-Ford Glass Company, Toledo, Ohio, a corporation of Ohio Application June 30, 1950, Serial No. 171,269

5 Claims. (Cl. 117—104)

The present invention relates broadly to surface films or coatings and more particularly to an improved method and apparatus for the application of films or coatings to smooth, finished surfaces of relatively hard materials such as glass or plastics.

Briefly stated, films are produced in accordance with the invention by spraying a surface to be treated with a hydrolyzable, volatile chloride. Utilizing this apparatus films can be formed on practically any material that will not be injured by the amount of heat required in filming, and on surfaces of all types and conditions.

For example, when a sheet of glass is first heated and then sprayed with titanium tetrachloride vapors, a very thin, colorless and transparent film, having a number of valuable properties is formed on the exposed surfaces of the glass sheet. The film is quite stable so far as ordinary usage is concerned. It is high reflecting, and in addition, is evenly wettable with water in the first instance, but non-wettable after washing and drying.

Because of these characteristics, such films are readily adaptable to a large number of uses, both in the glass and plastics fields. As for example, they can be applied to opaque glass or transparent plastics such as methyl methacrylate polymers and polyvinyl butyral plastics to produce mirrors for automobiles and aircraft. When formed on transparent glass surfaces, a transparent or one-way mirror results, and on transparent glass tableware, they serve to enhance both the beauty and utility of the pieces. When applied to plastics of the types mentioned many light weight non-breakable items having good optical qualities are produced.

It is therefore an aim of the present invention to provide a highly efficient method and means for applying such surface films or coatings and wherein the said means is of relatively simple construction and operation.

Another object of the invention is the provision of apparatus embodying a spray gun nozzle wherein dry air carrying the vapors of a hydrolyzable, volatile chloride is internally mixed with moist air and externally heated, the resulting product thereof being emitted to produce a uniform film or coating upon the selected surface.

Other objects and advantages of the invention will become more apparent during the course of the following description when taken in connection with the accompanying drawings.

In the drawings, wherein like numerals are employed to designate like parts throughout the same:

Fig. 1 is a longitudinal view of apparatus suitable for carrying out the invention;

Fig. 2 is a transverse section taken substantially on the line 2—2 of Fig. 1;

Fig. 3 is a detail view in cross-section of the spray gun nozzle; and

Fig. 4 is a perspective view of a glass or plastic plate filmed in accordance with the invention.

Referring now more particularly to the drawings, there is illustrated in Fig. 1 apparatus which may be employed in the filming of a large number of articles, and specifically glass or plastic sheets or plates, in a substantially continuous manner. As shown, the apparatus comprises essentially a preheating oven A, conveyor means B and filming apparatus C, the entirety being carried by a rectangular supporting framework 5. Said framework is composed of horizontal upper side members 6, horizontal bracing side members 7 and horizontal end and center members 8 carried upon a plurality of uprights 9.

The preheating oven A, suitably carried by the supporting framework 5, is provided with top and bottom walls 10 and 11 respectively, end walls 12 and 13 and suitable side walls to substantially enclose the oven A. Mounted within the oven and suitably attached to the inner surfaces of the top and bottom walls are electric heating means 14. One end wall 12 is preferably provided with a movable door or curtain 15 which may be opened to inspect the operation of the oven but which is normally only open a distance sufficient to permit the passage therethrough of the glass or plastic sheets. By keeping the door or curtain substantially closed, uniform temperature conditions may be maintained within the oven.

Extending longitudinally throughout the oven A from one end wall 12 thereof and beyond the other end wall 13 to the filming apparatus C is a rectangular tunnel 16, which comprises an end wall 17, top and bottom walls 18 and 19 respectively, and suitable side walls. This tunnel, which may be constructed from relatively light sheet metal serves as an insulating barrier for the glass or plastic sheets after they have been preheated and thereby maintains said sheets at substantially the temperature of the oven prior to their treatment in the filming apparatus C. It is to be noted that the end wall 17 of the tunnel is provided with an opening 20 merely of sufficient width to permit the passage of the glass or plastic sheets therethrough, thereby minimizing the loss of heat from the preheating oven and excessive cooling of the sheets prior to the filming treatment.

Located adjacent to the rectangular tunnel 16 is the filming apparatus C, the exterior construction of which comprises a substantially rectangular housing 21 consisting of end walls 22 and 23, side walls 24 and 25, and bottom and top walls 26 and 27 respectively. The filming housing 21 is preferably formed from relatively light sheet metal and is suitably carried upon the horizontal upper side members 6. Attached to the end wall 22 adjacent the tunnel 16 are angle braces 28 for supporting said tunnel substantially rigid with respect to the filming housing 21. Mounted upon the top wall 27 and attached thereto by any suitable means, as by angle brackets 29, is an exhaust stack 30 to carry away fumes or vapors from the filming operation.

With reference now to Figs. 2 and 3, there is mounted within the filming housing an angularly disposed spray gun nozzle 31, comprising an inner barrel 32 on the circumference of which is carried a heating jacket 33. The barrel 32 constitutes a hollow elongated chamber and provides means wherein the spraying materials may be mixed and heated, as will be more fully hereinafter described. Affixed to the discharge end of the barrel is a spray tip 34, while the opposite end thereof is provided with an insert plug 35 bored to receive a connecting tube 36 at a location substantially axially said end. Passing through one wall of the heating jacket and barrel and located at the upper end of the barrel laterally thereof is another connecting tube 37. Carried upon the outer walls of the heating jacket 33 at opposite ends thereof are cylindrical collars 38 and 39 suitably joined by a tube 40.

For the purpose of supplying dry air and a hydrolyzable volatile substance, such as titanium tetrachloride, to the barrel 32 there is provided a supply tube or hose 41 attached to the connecting tube 36 on the upper end of the barrel. To supply moist air to the barrel a hose 42 is attached to the connecting tube 37. Electric wires to furnish current to the heating jacket 33 are carried within a tube 43 and connected to the heating jacket through the tube 40 and collars 38 and 39 as shown at 44 and 45 in Fig. 3. The supply tubes or hose 41, 42 and 43 are preferably formed from a relatively flexible and durable material and for this purpose rubber or plastic compositions have been found satisfactory.

A mixture of titanium tetrachloride and dry air may be supplied to the inner barrel 32 through the supply tube 41 in any suitable manner, as for example, by bubbling air directly through the chloride or by passing air through the ascending vapors of the volatile chloride. The dry air serves as an effective carrying medium for the titanium tetrachloride vapors and provides a means whereby the resulting product may be passed through the spray tip 34 of the nozzle 31 under moderate pressure.

As noted above, moist air is directed into the barrel 32 through a hose 42 attached to the connecting tube 37 in one wall of the heating jacket and barrel. The moist air performs the function of hydrolyzing the titanium tetrachloride within the barrel to form titanium dioxide and hydrogen chloride according to the equation:

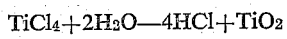

$$TiCl_4 + 2H_2O \rightarrow 4HCl + TiO_2$$

It is believed that the above reaction takes place within the barrel with the result that hydrogen chloride is liberated and titanium dioxide deposited as the film on the glass or plastic surface.

However, if the titanium dioxide and hydrogen chloride are emitted from the spray tip 34 when the temperature of the mixture is approximately equal to room temperature, a deposit forms in and around the spray tip causing clogging thereof. To substantially eliminate this difficulty and thereby secure relatively uninterrupted operation of the nozzle, the mixture is heated within the barrel by means of a heating jacket 33, shown in Fig. 3. The jacket is preferably carried upon the circumference of the barrel 32 and comprises any suitable insulated electric resistance means connected by electric wires 44 and 45 sufficient to raise the temperature of the mixture into the preferable range of 85 degrees to 150 degrees centigrade.

Since it is extremely desirable that the film or coating be as uniform as possible in order to attain the above mentioned qualities, the spray should be controlled in a manner to assure an even depositing of the chloride vapors. To accomplish this the nozzle 31 is angularly disposed with respect to, and slidably carried by, a movable carriage 46 and suitable attached thereto, as by a clamp 47. The carriage comprises a horizontal plate 48 on the opposite ends of which are mounted wheels 49 movable on a track 50 suitably attached to the end walls 22 and 23 of the filming housing 21. Power to move the carriage horizontally upon the track is supplied from an electric motor 51 and transferred to the carriage by an output shaft 52 connected to a crank arm 53 through a pin connection 54 to a link arm 55 and another pin connection 56. Upon rotation of the output shaft the crank arm and pin connection 54 will rotate and through the link arm cause the carriage to move laterally and horizontally back and forth on the tracks 50 and result in the deposition of a substantially uniform deposit of titanium dioxide as the glass or plastic sheet simultaneously moves in a horizontal, longitudinal path beneath the spray gun nozzle 31.

Extending longitudinally with respect to the supporting framework 5 and through the preheating oven A and the filming housing 21 is the conveyor means B. As may be seen in Fig. 2, the conveyor means comprises conveyor rollers 57 rotatable upon shafts 58 journaled at their opposite ends in bearings 59 carried by supporting means 60 suitably attached to the supporting framework 5. Mounted upon one end of each conveyor shaft 58 is a sprocket 61 over which is trained a chain 62 driven by and connected to a power mechanism. By this chain and sprocket linkage all conveyor rollers rotate at the same speed and thereby assure the flow of the glass or plastic sheets through the preheating oven and filming apparatus at uniform speed.

Should it be desired to clean the barrel 32 and/or spray tip 34, the nozzle 31 may be readily removed by disengaging the supply tubes or hoses 41, 42 and 43 from their respective connections on the nozzle and by loosening the clamp 47 which secures the nozzle 31 to the movable carriage 46. The nozzle with spray tip attached thereto may then be removed from within the filming housing 21 and the exterior and interior of the nozzle 31 and spray tip 34 cleansed with cold water or any other suitable substance. In cleaning the exterior of the nozzle care should be exercised to prevent moisture from contacting the electrical connections 44 and 45.

Inasmuch as the apparatus of this invention is of substantially equal application to the filming or coating of both glass or plastic sheets or plates, the operation of the invention with reference to the filming of glass articles will first be detailed followed by a brief description of a modified process for filming plastic sheets or plates.

When glass sheets that are cold or at room temperature are exposed to the vapors of titanium dioxide, a deposit results that is translucent, foggy, evenly wettable and may be somewhat crystalline, but which after washing and drying, by vigorous rubbing with a towel, will become transparent and non-wettable. However, when the glass is heated, prior to exposure, a film that is immediately high reflecting, transparent, and colorless, as well as non-wettable after washing and drying is deposited. For this reason the glass sheets 63 are preferably moved on the conveyor means B through the preheating oven A to bring them to the desired temperature before being filmed. The preheating temperature may range from 50 degrees centigrade to any point below the melting point of the glass, however, a temperature of approximately 350 degrees centigrade has been found to be the best for all around use and results.

A glass sheet or plate 63, having been brought to the desired temperature within the preheating oven, passes on the conveyor means through the rectangular tunnel 16 into the filming housing 21 where it will be sprayed by a mist of titanium dioxide from the nozzle 31. It is to be noted that the nozzle 31 is angularly disposed with respect to the glass sheet or plate 63, that is, it is arranged whereby a spray of titanium dioxide or any suitable coating material will be emitted from the spray tip 34 at an angle other than a right angle with respect thereto. By so positioning the nozzle 31 and providing means whereby the nozzle is transversely movable as the glass sheets or plates simultaneously progress longitudinally forwardly beneath the spray, a substantially uniform deposit of coating material on the selected surface of the glass sheet or plate is assured.

As the glass sheet passes over the conveyor rollers 57 in a horizontal position and longitudinally with respect to the filming housing the leading marginal edge is sprayed with the volatile chloride vapors from one side edge to the other side edge. Thus, as the sheet or plate continues over the rollers and at the same time the nozzle is movable transversely by means of the carriage 46 on the tracks 50, the glass plate is sprayed in successive transverse sections until the length of the plate is completely and uniformly filmed. In other words, as the glass plate progresses longitudinally through the filming housing and passes beneath the nozzle 31, a transverse strip extending from one side edge to the other side edge is filmed or coated, followed by the spraying of successive transverse strips until the trailing marginal edge is filmed with titanium dioxide, thereby producing a uniform film or coat 64 upon the upper surface of the glass sheet or plate substantially as shown in Fig. 4.

If desired, after having been properly coated, the glass plates may pass through another section wherein they may be slowly cooled, or further heated and then cooled, either rapidly or slowly, depending on the type of annealing treatment desired. In some instances, the coated sheets can be removed directly from the filming housing 21 and permitted to cool in the open air.

In the filming or coating of plastic articles the temperature of the preheating oven is preferably substantially lower than the temperature recommended in the preheating of glass plates. Since the filming operation can be more readily controlled if the temperature of the plastic surface is somewhat higher than room temperature, the plastic article is preferably heated at a temperature in the range from 50 degrees to 80 degrees centigrade.

In the filming or coating of either glass or plastic sheets or plates, if it is desired to provide the articles with a colorless film on both surfaces, the plates may be turned over upon leaving the filming housing and the untreated surface thereof subjected to the filming operation above described.

In addition to titanium tetrachloride, germanium tetrachloride, vanadium tetrachloride, zirconium tetrachloride and stannic tetrachloride may be employed in filming surfaces by the apparatus of the invention.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In spray apparatus of the character described, a hollow elongated barrel, heating means carried upon the circumference of said barrel and extending substantially entirely from one end of said barrel to the other end thereof, common means for simultaneously introducing dry air and a hydrolyzable, volatile substance into one end of the barrel substantially axially thereof, means passing through one wall of the heating means for supplying moist air laterally into the barrel adjacent said end where it is mixed with the dry air and hydrolyzable, volatile substance, and means carried within the opposite end of the barrel for emitting the mixed heated spraying material in the form of a spray.

2. In spray apparatus of the character described, a hollow elongated barrel having a substantially uniform inner diameter, heating means carried upon the circumference of said barrel and extending substantially entirely from one end of said barrel to the other end thereof, an insert plug received within one end of the barrel and bored to receive a hollow connection through which a mixture of dry air and a hydrolyzable, volatile substance may be introduced into the barrel, a hollow tube passing through one wall of the heating means for supplying moist air laterally into the barrel adjacent said end where it is mixed with the dry air and hydrolyzable substance, and a spray tip received within the opposite end of the barrel and extending beyond said end thereof for emitting the mixed heated spraying material, said heating means being positioned for heating the barrel and spray tip of the apparatus whereby the material within the barrel is heated from the point of mixture of the material to the exit end of the barrel and maintained at a temperature of 85 to 150 degrees centigrade at the point of exit.

3. The method of spraying a selected surface, comprising delivering a hydrolyzable volatile halide and moist air into one end of a hollow elongated chamber from separate sources and at an angle to one another, mixing said materials whereby a chemical reaction takes place, applying heat to the chamber substantially simultaneously throughout the entire length thereof, and emitting the resulting product as a spray from the opposite end of the chamber and against the selected surface.

4. The method of spraying a selected surface, comprising delivering a mixture of dry air and a hydrolyzable, volatile chloride into one end of a hollow elongated chamber substantially axially thereof, simultaneously supplying moist air laterally into the chamber adjacent said end, mixing said materials whereby a chemical reaction takes place, applying heat to the chamber substantially simultaneously throughout the entire length thereof, and emitting the resulting product as a spray from the opposite end of the chamber and against the selected surface.

5. The method of spraying a selected surface, comprising delivering a hydrolyzable, volatile halide into one end of an elongated chamber longitudinally thereof and simultaneously introducing moist air into the chamber adjacent said end but laterally thereof, causing said materials to be mixed with one another as they enter the chamber to effect a chemical reaction therebetween, passing the mixed materials through the chamber, applying heat to the chamber substantially simultaneously throughout the entire length thereof, and emitting the mixed heated material as a spray from the opposite end of the chamber and against the selected surface.

References Cited in the file of this patent

UNITED STATES PATENTS

| | | |
|---|---|---|
| 675,840 | Phillips | June 4, 1901 |
| 1,007,667 | Ballard | Nov. 7, 1911 |
| 1,595,362 | Schaefer | Aug. 10, 1926 |
| 1,660,557 | Heimburger | Feb. 28, 1928 |
| 1,764,387 | Buchet | June 17, 1930 |
| 1,779,849 | Lusk | Oct. 28, 1930 |
| 1,831,535 | Juers | Nov. 10, 1931 |
| 1,894,729 | Bozarth | Jan. 17, 1933 |
| 1,967,235 | Ferkel | July 24, 1934 |
| 1,971,804 | Alexander | Aug. 28, 1934 |
| 2,118,212 | MacLaurin | May 24, 1938 |
| 2,118,795 | Littleton | May 24, 1938 |
| 2,362,634 | Houghton | Nov. 14, 1944 |
| 2,411,409 | Ballard | Nov. 19, 1946 |
| 2,429,420 | McMaster | Oct. 21, 1947 |
| 2,644,717 | Kopperschmidt | July 7, 1953 |